Oct. 20 1925.

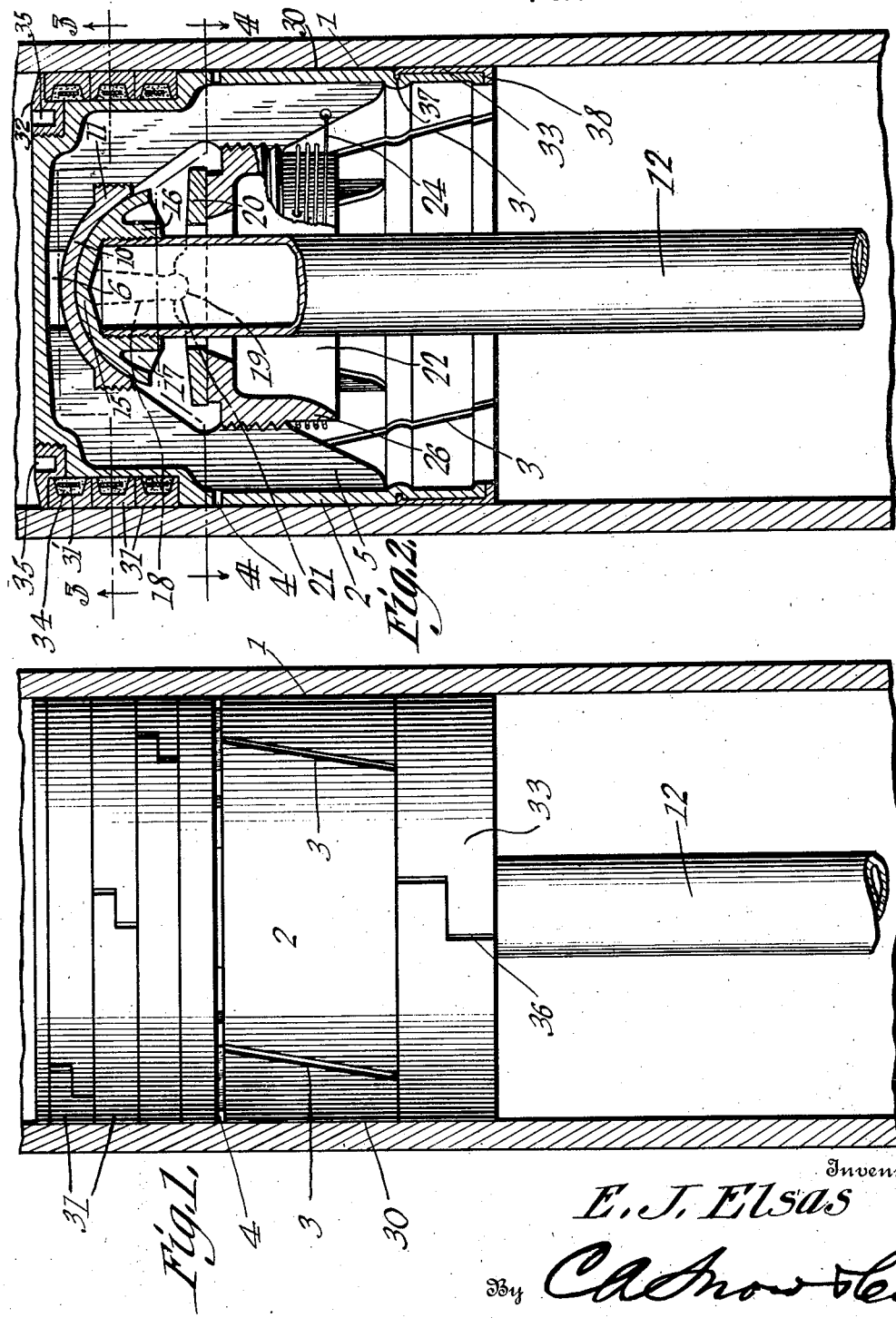

E. J. ELSAS 1,557,818

COMBUSTION ENGINE, PISTON, AND BEARING

Filed Dec. 6, 1924  2 Sheets-Sheet 2

Inventor

E. J. Elsas

By C. A. Snow & Co

Attorneys

Patented Oct. 20, 1925.

1,557,818

UNITED STATES PATENT OFFICE.

EDWARD J. ELSAS, OF KANSAS CITY, MISSOURI.

COMBUSTION ENGINE, PISTON, AND BEARING.

Application filed December 6, 1924. Serial No. 754,381.

*To all whom it may concern:*

Be it known that I, EDWARD J. ELSAS, a citizen of the United States, residing at Kansas City, in the county of Jackson and State of Missouri, have invented a new and useful Combustion Engine, Piston, and Bearing, of which the following is a specification.

This invention relates to internal combustion engines and more particularly to pistons and bearings therefor.

The object of the invention is to so construct a piston and its bearing as to practically eliminate piston gyration and uneven wear of the piston and the cylinder.

Another object of the invention is to so construct a piston and its bearing as to retain the virtues of light weight, tight fit and to raise the bearing as high in the piston as practical thereby gaining the double advantage of lengthening the leverage lines of resistance to gyration while at the same time shortening the explosion shock leverage lines.

Another object is to provide a connecting rod bearing for pistons in which one member is rotatably mounted upon a substantial and positive automatically tightening device for self adjustment and for compensation for wear in the bearing.

Another object is to provide a piston of this character constructed so that the upper portion cannot beat against the cylinder walls under explosion shock.

Another object is to provide a piston of this character with a tight fit, broad and thin sectioned bearing and wearing ring upon the skirt of the piston which may be easily attached and removed.

Another object is to provide a piston in which all of its wearing and bearing parts are easily removed for replacement when necessary.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a piston constructed in accordance with this invention and mounted in operative position in the cylinder, the latter being shown in section;

Fig. 2 is a longitudinal vertical section through the piston and cylinder;

Figure 3:
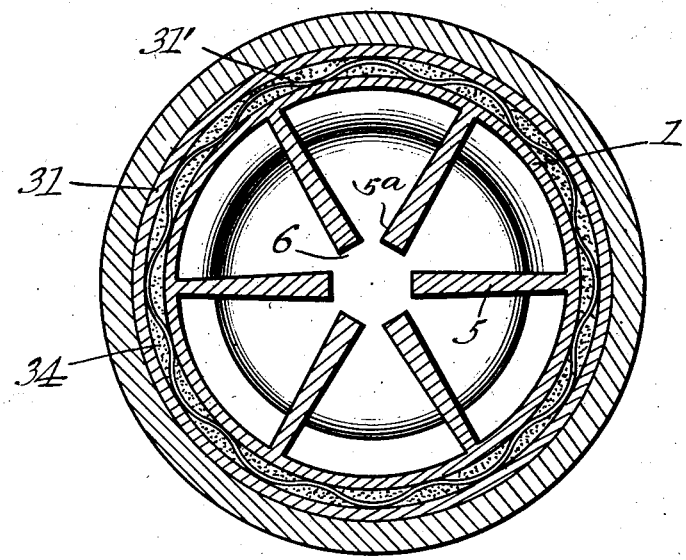
Fig. 3 is a horizontal section taken on the line 3—3 of Fig. 2.
Figure 4:
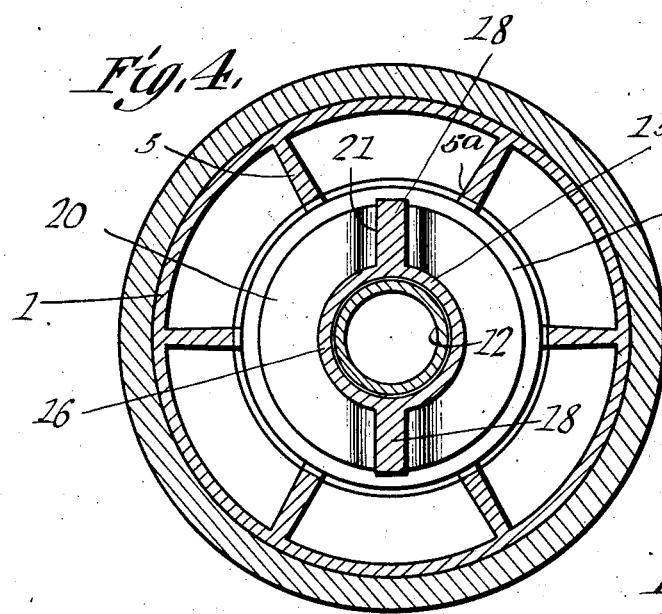
Fig. 4 is a similar view taken on the line 4—4 of Fig. 2.
Figure 5:
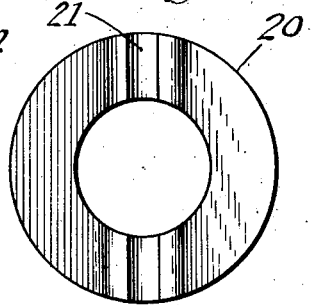
Fig. 5 is a top plan view of the collar employed in the structure.

In some cars the piston has great width for its length and a center pin pivot bearing which with its weight are prime causes of piston gyration with momentum. A ball and socket bearing is undesirable in a piston because of the excessive weight as compared with its thrust bearing surface and its too great heat-holding and other defects.

It has been found by examining the pistons of various cars that the most wear of the cylinder side extends beyond the area of greatest side pressure from the rod and is thence caused by gyration of the piston upon its pin whereby battering of its upper corner against the cylinder wall by the shock of the explosion is produced. If the back pressure of the down power stroke of the rod where the chief cause of the uneven wear the vertical outline of the worn face of the cylinder wall would show an incurve at the top and the fact that it shows an outcurve, if any, instead of an incurve is proof that the wear at this point is not due chiefly to resultant cross head forces but to gyration of the piston upon its pivot bearing. It is understood that the gyration would be influenced enough of course by rod side pressure, its pivot or balance thrown enough upon that side, on initial downward motion of the piston as to cause the chief hammering on the side that the side pressure directs.

Many devices have been devised to counteract the common one side wear of cylinders and it has been found that there are only three conceivable causes other than piston gyration that could affect uneven wear at the very top of the piston and cylinder, these are:

First, the momentum of the directed piston in motion, its tendency to keep on any straight line started, but in this case it would operate only on the upstroke side of the cylinder.

Second, gases, etc., blowing down past the piston ring and apparently this begins at a stage too late to account for the wear.

Third, side pressure of the connecting rods in the down power stroke, but this is less at the very top of the cylinder, than it is at one tenth down the stroke where expert engineers put the climax of side pressure.

Experiments have proven that the chief wear of motor cylinders is caused by explosion shock gyration of the piston upon its pivot pin and not by piston rod side pressure.

Uneven wear of the upper areas of the piston and cylinder are further caused by oil pumping and beating of the piston rings which is increased by their attaining vertical motion from wear and by there being an open clearance beneath the rings.

It has also been found that while piston rings may fit in the top of the cylinder tightly, four rings in grooves often doing so in pistons, yet the usual piston by necessary clearance beneath its rings and about its top is permitted a hammering, battering and lateral motion under shock and this is confined of course to the rod pressure side although not caused by rod back pressure per se.

There is also another point to consider, which is this, that a piston naturally wears first and most at its ends. Thus if any part of the mid area is a snug fit to start with and a clearance provided at the top there will be some natural binding here under the explosion shock and a very little wear of the cylinder and piston will cause this snug fit central area to become a leverage fulcrum over which is oscillated and hammered the ends of the piston against the cylinder wall and more particularly at the top of the piston.

Slight wear of the pin bearing adds to the evils above noted.

In the embodiment illustrated the piston 1 embodying this invention is preferably of special metal bearing and of light metal body with its skirt 2 divided in sections by slits 3 and outwardly separated from the piston head by an annular slot 4. The body of the piston 1 has within it a plurality of radial webs 5, any desired number of which may be employed, six being here shown. These webs stiffen the piston so that it can be made of thin light metal and they also conduct the heat away from the bearing and carry the connection rod bearing in an automatic device to be described for adjustment and wear compensation. As shown the skirt 2 is divided by the spiral slits 3 into three sections each of which is carried by a pair of the webs 5, the inner edges of which are thickened as shown at 5ª to strengthen the thread thereof.

These webs 5 not only stiffen the piston and dispose of the heat but are made broader and deeper toward the middle part of the piston to carry its bearing mechanism, their deepest portion not uniting them but having space 6 shown left open for free cooling circulation.

The piston rod head bearing 10 is constructed of special bearing metal is made in the shape of a spherical shell with its periphery or border thickened as shown at 11 and the outer face of said thickned portion threaded and adapted to be screwed into a seat formed in the inner edges of the webs 5 as is shown clearly in Fig. 2, said thread and seat taking the piston thrust.

The connecting rod 12 is of tubular formation and its upper end is threaded into a small block head 15 with a fine tight thread and the lower or inner part of the thread is soldered or brazed to prevent its turning after being seated.

The bronze rod head 15 has a depending circular or tubular center 16 which is threaded to receive the rod 12 as is shown clearly in Fig. 2.

To further decrease the heat holding properties of the head and to lighten it, it is hollowed out to form webs 17.

This sphere-sectional rod head 15 is equipped with diametrically opposite radially extending arms 18 the lower edges 19 of which are rounded as shown in dotted lines in Fig. 2 which are journaled a little beyond the dead center of the axis of the head rotation and, adapted to coact with the main bearing for the head. These arms 18 are mounted in suitable seats 21 formed in a hard metal washer or collar 20, upon which the rod head rocks as the engine is in motion and also has a rotative reciprocal action in its bearings 10. The rod head 15 is mounted through the collar 20 to slide upon a strong ring 22 which is coarsely threaded into the webs 5 and is operated by a tension spring 24 hooked at one end to one of the webs 5 and at its other end to the ring and by means of which the rod head 15 is automatically kept tight in place.

To accommodate the coiled spring 24 the lower portion of the ring 20 is reduced on its outer face as shown at 26.

To assemble the parts of this piston the bearing ring 22, and the collar 20 are placed on the connecting rod 12. Then the rod head 15 is screwed onto the upper end of the rod in proper position and soldered or brazed if necessary. These connected parts are then inserted in the piston 1 and the ring 22 moved into position and the tension spring 24 tightened up and hooked.

The piston 1 has the whole middle area 30 of its outer circumference formed with a clearance between it and the cylinder wall so that this part cannot bind the piston or by wear become a fulcrum over which the piston ends will hammer against the cylinder wall.

The cylinder wall bearings of the piston are composed of removable rings 31 located at the upper portion of the piston, three of which are here shown. These broad faced piston rings 31 occupy about all of the upper portion of the cylindrical face of the piston and have their inner portions made resiliently resistful instead of free to strike and at their inner edges are adapted to strike the bottom of their groove as soon as or sooner than any part of the piston can laterally strike the cylinder wall under explosion shock. These rings constitute the whole cylinder wall bearing of the piston except the tight fit gyration resisting, broad wearing ring 33 carried by the piston skirt.

The rings 31 are channeled in cross section with the grooves or channels faced inwardly and packed with a resilient fire-proof felt or light substance 34 which is graphited to insure against passage of oil of gases. The packing in the rings 31 may largely resist side shock of the piston, as well as permanently prevent oil pumping which is usually around the inner sides of the usual rings and are equipped with edgewise disposed sheet steel ribbon springs 31', which are made serpentine in form as shown in Fig. 3 and have each a longitudinal opening to allow its free longitudinal movement and which operate to increase the resiliency of the packing 34 and thereby assist in forcing the rings out against the cylinder wall and prevent leakage of the oil past the piston. These rings 31 are broad to provide a good outside bearing and wear surface and are replaceable when worn. The rings 31 constituting the whole upper bearing of the piston may be easily removed and new ones installed should lateral vibration of the top of the piston develop.

The rings 31 are located in one annular groove formed in the outer face of the piston 1 whereby a maximum bearing surface of this end of the piston is provided and also adapts all the rings to be tightened in a single operation.

Forming the periphery or border of the piston head is a somewhat square sectioned interiorly threaded ring 32 having an annular flange at its upper edge which extends out over the seat in which the piston rings 31 are mounted. This ring 32 is threaded on the piston head with a coarse and loose fitting thread packed with graphite or other non-combustible lubricating substance to prevent the ring from welding or adhering to the piston. This ring is also equipped with wrench holes 35 to facilitate its turning. By simply turning down this ring 32 the wear on the horizontal faces of the rings 31 and on the sides of their groove or chamber may be taken up and the whole assembling tightened after wear.

The broad oil wiping and wear bearing ring 33 which is mounted on the outer face of the lower portion of the skirt fits tightly and is preferably made of expanding resilient material having a step-shaped dividing slit 36 and is equipped at its upper edge with an inturned flange 37 designed to fit in a groove in the face of the piston. At its lower edge it is equipped with an inturned flange 38 which seats against the end of the piston. In the assembling of the piston proper and its parts the broad oil wiping and wear bearing ring 33 is slipped into place on the piston skirt. The piston rings 31, each with its packing is slipped on the head end of the piston without requiring to be strained or expanded appreciably. The adjusting and fastening ring 32 is then threaded on the piston head and bears down on the rings 31 with the required pressure to hold them in operative position.

I claim:—

1. The combination of a hollow piston and a connecting rod, an abbreviated form of ball and socket joint uniting said rod and piston, the ball member of said joint being held in universal rotative union with its socket, radial webs mounted in said piston and supporting said socket member, the ball member of said joint being carried by said rod, means for supporting the rod carried bearing member to permit rocking of said member when the engine is in motion also to permit rotative reciprocable action of said member in its bearing socket, and means for automatically tightening said joint members and retaining them in operative position.

2. The combination of a hollow piston having radiating webs in its inner end, a segmental shell-like bearing member fixed to the inner ends of said webs, a connecting rod having a convexed head to fit in the web carried bearing, diametrically opposite radially extending arms carried by said head, a collar surrounding said rod and having seats to receive said arms, said seats and arms having a rocking connection, a rod, and a tension spring engaged at one end with said ring and at its other end with one of said webs by means of which the ring is turned and the rod head automatically kept tight in position.

3. The combination of a hollow piston having radiating webs in its inner end, a segmental shell-like bearing member fixed to the inner ends of said webs, a connecting rod having a convexed head to fit in the web carried bearing, diametrically opposite radially extending arms carried by said head, a collar surrounding said rod and having seats to receive said arms, said seats and arms having a rocking connection, a ring coarsely threaded into said webs and surrounding said rod, a tension spring engaged at one end with said rings and at its other end with one of said webs by means of which the ring is turned and the rod head automatically kept tight in position.

4. The combination of a hollow piston having radiating webs in its inner end, a segmental shell-like bearing member fixed to the inner ends of said webs, a connecting rod, a convexed head threaded on said rod and adapted to fit in said bearing member, said head having a depending circular skirt threaded onto the rod and hollowed out to form webs, a collar surrounding said rod and having a connection with said head to provide for rocking of the head when the engine is in motion, and means threaded into said web and operable to automatically tighten the head and hold it in operative position.

In testimony that I claim the foregoing as my own I have hereto affixed my signature.

EDWARD J. ELSAS.